United States Patent [19]

Chan

[11] Patent Number: 5,498,091
[45] Date of Patent: Mar. 12, 1996

[54] CONNECTING ASSEMBLY FOR FIXING THE TUBULAR STEM/STUD OF A PORTABLE LAMP TO THE BASE OF THE SAME

[75] Inventor: Kam-Hoi Chan, Kowloon, Hong Kong

[73] Assignee: Go-Gro Industries Ltd., Kowloon, Hong Kong

[21] Appl. No.: 391,614

[22] Filed: Feb. 21, 1995

Related U.S. Application Data

[63] Continuation of Ser. No. 9,783, Jan. 27, 1993, abandoned.

[30] Foreign Application Priority Data

Jan. 27, 1992 [HK] Hong Kong ............... 92201856.1
Jun. 22, 1992 [HK] Hong Kong ............... 92225228.9

[51] Int. Cl.$^6$ .................... H01R 33/46; F16B 21/02
[52] U.S. Cl. .................... 403/3; 403/348; 403/282; 403/277; 362/410
[58] Field of Search .................... 403/3, 4, 348, 403/282, 280, 277, 281; 29/512, 513, 507, 523; 285/189, 382; 248/558, 519, 539; 362/410, 414

[56] References Cited

U.S. PATENT DOCUMENTS

| | | | |
|---|---|---|---|
| 482,808 | 9/1892 | McGoron | 285/382 |
| 933,714 | 9/1909 | Krumming | 29/512 |
| 1,392,120 | 9/1921 | Cooper | 248/519 X |
| 1,539,388 | 5/1925 | Franz, Jr. | 29/512 |
| 1,779,712 | 10/1930 | Poeppel | 29/513 |
| 1,841,575 | 1/1932 | Dorsch | 29/512 |
| 2,017,421 | 10/1935 | Post | 29/512 |
| 2,160,598 | 5/1939 | Melrath | 29/513 |
| 2,400,235 | 5/1946 | Johnson | 248/519 X |
| 2,761,209 | 9/1956 | Fisher | 29/513 |
| 2,857,665 | 10/1958 | Cohen | 29/513 |
| 3,119,588 | 1/1964 | Keats | 248/519 X |
| 3,265,349 | 8/1966 | Hamrick | 29/513 |
| 4,482,089 | 11/1984 | Lindahl et al. | 29/512 |
| 5,149,149 | 9/1992 | Wu | 403/348 |
| 5,172,595 | 12/1992 | Bush | 403/348 |

FOREIGN PATENT DOCUMENTS

| | | | |
|---|---|---|---|
| 91231168.1 | 7/1992 | China . | |
| 871171 | 4/1942 | France | 29/513 |
| 34541 | 9/1908 | Germany | 362/410 |
| 90217 | 12/1922 | Germany | 362/414 |
| 2712274 | 7/1978 | Germany | 248/519 |
| 4013457 | 10/1991 | Germany . | |
| 276204 | 9/1951 | Switzerland | 29/512 |
| 2164 | 6/1875 | United Kingdom | 29/512 |
| 141321 | 11/1920 | United Kingdom | 29/513 |
| 170337 | 10/1921 | United Kingdom | 29/512 |
| 491426 | 9/1938 | United Kingdom . | |
| 512543 | 9/1939 | United Kingdom . | |
| 603984 | 6/1948 | United Kingdom . | |
| 618033 | 2/1949 | United Kingdom . | |
| 679650 | 9/1952 | United Kingdom . | |
| 703034 | 1/1954 | United Kingdom . | |
| 770363 | 3/1957 | United Kingdom . | |
| 997003 | 6/1965 | United Kingdom . | |
| 1462107 | 1/1977 | United Kingdom . | |
| 2234797 | 2/1991 | United Kingdom . | |

Primary Examiner—Anthony Knight
Attorney, Agent, or Firm—Merchant, Gould, Smith, Edell, Welter & Schmidt

[57] ABSTRACT

A connecting assembly for fixing the tubular stem/stud of a portable lamp to the base of the same comprising a tube having a butting shoulder to abut upon the upper end of a top hole in the base of a portable lamp, and folding tabs at the lower end of the tube which are folded outwardly to fix the tube tight to the base. As the tube is expanded during a folding procedure, a tight fit is realized. The top hole in the base may include one or two recessed tubular portions to facilitate assembly and ensure rigidity of the assembly.

3 Claims, 6 Drawing Sheets

CONNECTING ASSEMBLY FOR FIXING THE TUBULAR STEM/STUD OF A PORTABLE LAMP TO THE BASE OF THE SAME

This is a continuation of application Ser. No. 08/009,783, filed Jan. 27, 1993, now abandoned.

BACKGROUND OF THE INVENTION

The present invention relates to a connecting assembly for fixing the tubular stem/stud of a portable lamp to the base of the same.

Figure 1A:
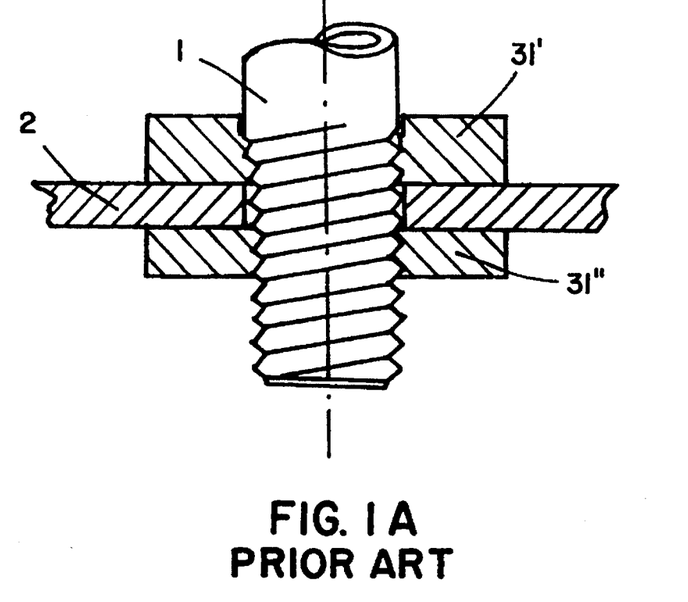
FIG. 1(a) illustrates a connecting assembly comprising a stem/stud having a threaded lower portion, and two nuts at both sides of a base.
Figure 1B:
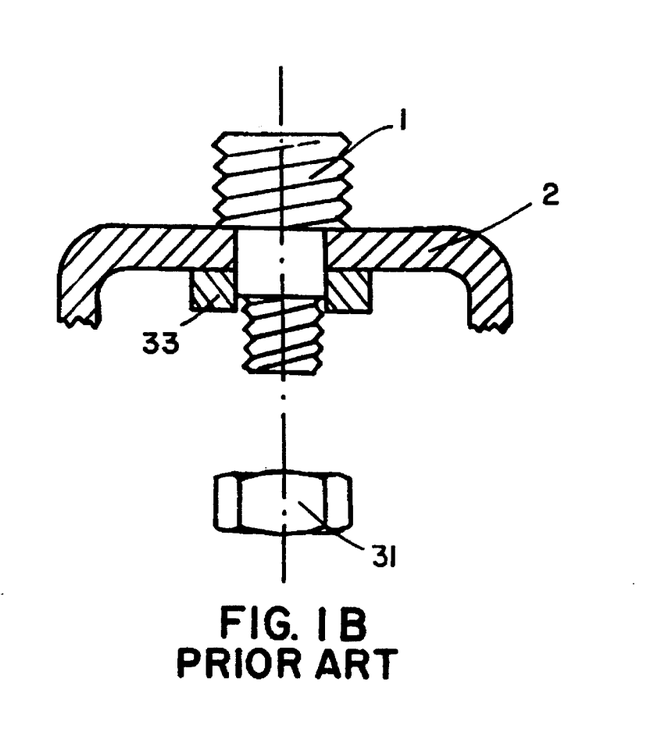
FIG. 1(b) shows a connecting assembly comprising a stem/stud having a necked portion and only one nut to tighten the same to a base.

In the prior art, connection between a stem/stud and a base is made by using a screw thread and nut(s). Refer to FIG. 1(a) and (b). FIG. 1(a) shows a stem/stud (1) which has a threaded lower portion. The lower portion is screwed into a first nut (31') with a countersink in the top, and then inserted through a hole in a base (2), and is further fixed tight by a second nut (31"). FIG. 1(b) shows an improvement over the above structure, wherein the stem/stud (1) is necked to form a shoulder in order to eliminate the first nut. The threaded portion of the stem/stud (1) is inserted through holes made in a base (2) and a weight block (33). A nut (31) is threaded onto the stem/stud to fix all the parts together. Nevertheless, such structures are all related to threaded connection.

Following are some of the shortcomings of the prior art structures as mentioned above.

First, as is common knowledge, a threading procedure reduces the mechanical strength of a pipe. A remedy, pipe wall thickness has to be increased, which in turn will increase the cost. When a necking procedure is adopted, the pipe inside diameter is reduced. Besides, a necking procedure can not produce a right angle shoulder for butting which may prevent perpendicular assembly of the stem to the base.

Secondly, a screw nut is not only easy to loosen, but also has an axial dimension which is much larger than the wall thickness of a pipe. If a lock washer or such is used, the total axial height of the nut and the washer would be even larger. Moreover, use of a lock washer makes assembly more complicated. To prevent the nut from loosening, sometimes it is welded to the end of the threaded portion of the stem/stud. Even so, the connecting stem/stud can still turn in the base hole, if a proper locking device is not adopted.

Thirdly, after threading the end of the stem/stud, the stem/stud usually is painted or plated. Since usually fine thread is used, painting or plating he stems/studs can fill the threads so thay no longer mate with the nut. As known, a painting layer is much thicker than a plating layer. So during the painting procedure, even if only one drop of paint drops onto the threaded portion of the stem/stud, the result would be that the nut can no longer be threaded onto the stem/stud.

Fourthly, threading procedures are expensive; and the requirements for the raw material of the pipe which is to go through a threading procedure is also high, for the pipe diameter must be within a close tolerance, and the welding seam should be of the same strength as that of the pipe.

Fifthly, in the case of standard lamps, very often the user has to screw the tube stem to the base by himself, in which case the power supply cord located inside the stem/stud tube is often seriously wrung after assembly. One way to cope with this problem is to arrange the cord outside the stem/stud; another is to raise the base a bit higher by adding several legs to it, so that the power supply cord can run under the base into the tube. In both of the above cases, the cord is not running into the base at a fixed location. Besides, when the cord is made to run outside the stem tube, the lamp becomes bad-looking in appearance, and will easily be tipped over if someone stumbles over the cord. If, on the other hand, legs are added to raise the base to allow the cord to run beneath it, the cord which is usually in touch with the floor is apt to get worn when the lamp is moved here and there. Besides, raising the base to leave room for a cord to run means a higher center of gravity; and adding legs to the base will reduce the bottom area between base and floor (for instance, from a circle to an inscribed triangle if three legs are added). All these will result in that the lamp is much more easily tipped over.

Sixthly, a threaded connection is not suitable for use with pipes other than round ones. This largely limits the scope of raw materials.

OBJECTS OF INVENTION

The primary object of the present invention is to provide a connecting assembly for fixing the tubular stem/stud of a portable lamp to its base in which the connecting assembly is free of all the above shortcomings in the prior art, easy to manufacture at a low cost, and more reliable and rigid.

Another object of the present invention is to provide a connecting assembly which consists of the least number of composing parts and can make use of a wide range of raw materials, including seamed pipes, pipes manufactured under either the metric system or the inch system, and also pipes which do not require a close manufacturing tolerance.

BRIEF DESCRIPTION OF DRAWINGS

The above-mentioned objects, as well as other advantages of the present invention, will become clear by the following detailed description of several preferred embodiments of the present invention, with reference to the accompanying drawings, wherein.

DESCRIPTION OF INVENTION

The principle of performance of the connecting assembly according to the present invention is somewhat like that of a bifurcated rivet. When a bifurcated rivet's two legs are put through a hole of a book and bent outwardly until the rivet's head abuts upon the edge of said hole, the book is clamped tightly. Similarly, in the present invention, a connecting stem/stud with butting portion(s) and foldable tabs is used. The tabs function similarly to that of a bifurcated rivet's legs. Folding the tabs will not only realize a tight fit to prevent the connecting stem/stud from any motion with respect to the base, but also largely simplifies the manufacturing procedures.

Following will be a detailed description of all of the embodiments according to the present invention.

Figures 3A, 3B:
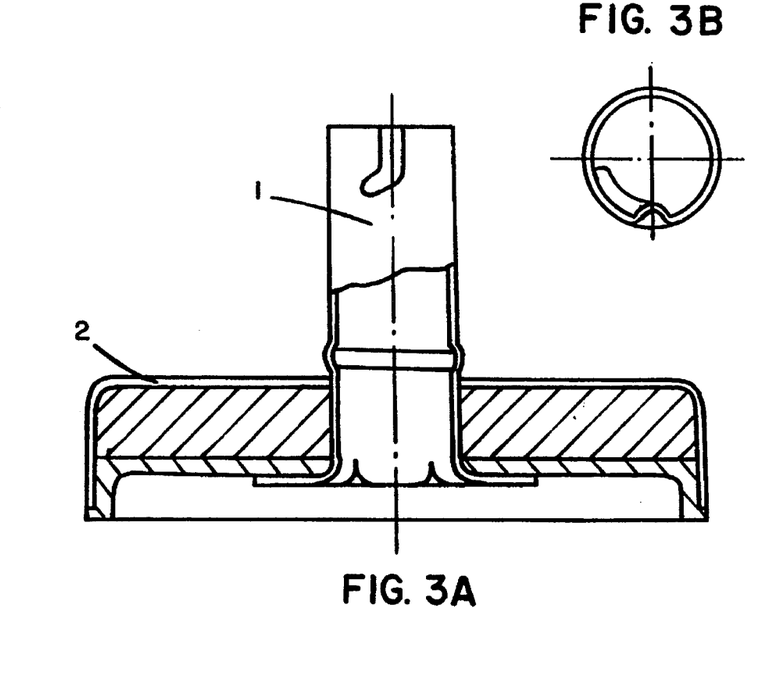
FIG. 3(a) is a sectional view of a first embodiment of the present invention, where the cord (not shown) runs outside the connecting structure.
FIG. 3(b) is a top view of the stem/stud of FIG. 3(a)

FIG. 3(a) and 3(b) shows a first embodiment of the present invention. As is clear from FIG. 3(a) and 3(b), the connecting stem/stud (1) has no threaded portion, nor is there a screw nut. Instead, the stem/stud (1) has a ring bead formed to abut upon the upper surface of a base cover (2), and the lower end of the stem/stud is split into a number of tabs which are folded outwardly to clamp the stem/stud tightly to the base (2). As compared with the prior art structures, illustrated in FIGS. 1(a) and (b), the structure of this embodiment has a number of advantages. First, the base is of a lower height, which means a lower center of gravity, and a smaller blanking size is required for the base cover and less material for the base bottom is used. Next, the threaded stem/stud in the prior art is usually made of copper, aluminum or thick-wall pipe, while the stem/stud in the present embodiment can be made of thin-walled seamed pipe since no threaded portion is present. Moreover, in the prior art structures, the stem/stud must have an outside diameter in close tolerance to mate with the corresponding holes in the base, the weighting block, the bottom cover, etc. As the weighting block is usually made of cast iron with a cast hole, it is apt to slide to and fro in the event of a poor fit with the stem/stud. In the present embodiment, however, since the tabs at the lower end of the stem/stud are folded outwardly by an air/hydraulic press, in which a pilot element of a folding tool usually expands the tube end, a tight fit is ensured. Therefore, a much broader manufacturing tolerance is allowed of the stem/stud and the corresponding holes. Actually, the stem/stud in FIGS. 3(a) and 3(b) can be made with severed margin piping material; and since the stem/stud is very short, any available forming procedures, such as necking, stamping, expanding, etc., can be easily used. Lastly, since pressing and folding procedures are adopted to realize a tight fit, the stem/stud tube is usually deformed and becomes other than round in shape. Thus, the stem/stud is fitted tightly in the base and can never be turned.

Figure 4:
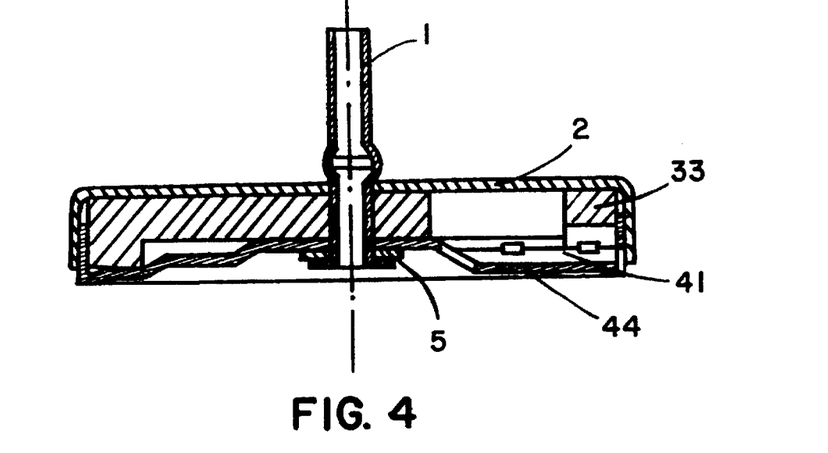
FIG. 4 is a sectional view of a second embodiment of the present invention with internal wiring (also not shown) running inside said structure.
Figure 5:
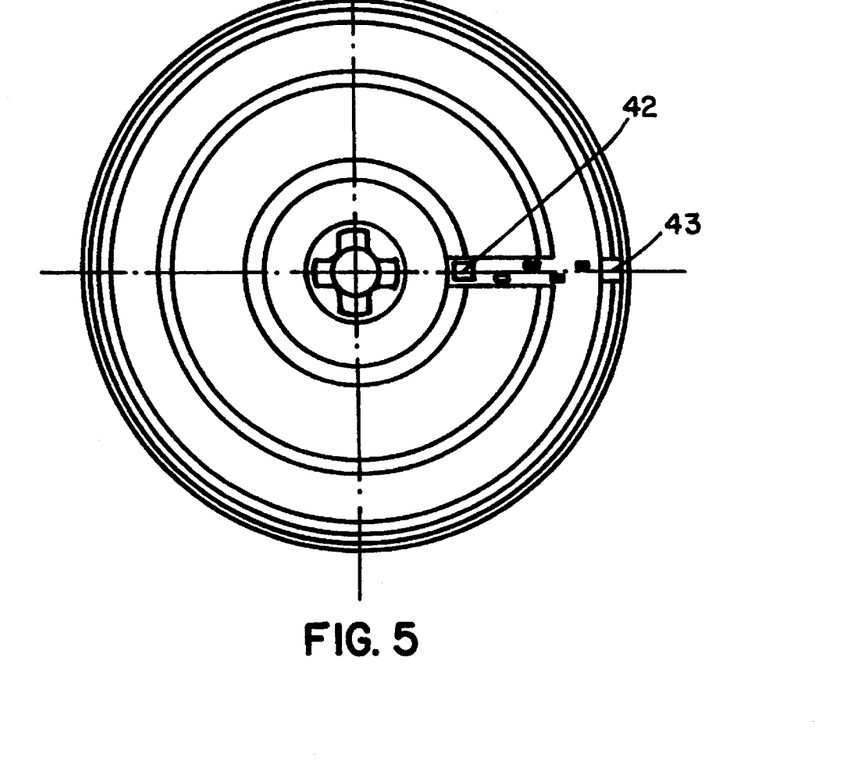
FIG. 5 is a bottom view of the embodiment in FIG. 4.

FIGS. 4 and 5 illustrate a second embodiment of the present invention, comprising a stem/stud (1), a base cover (2), a weighting block (33) and a base bottom (44), same as in FIGS. 3(a) and 3(b), and a power cord way (41), which comprises two openings (42) and (43) for the cord to go through, and a washer (5). As above, the stem/stud tube is made with severed margin material of thin-walled seamed pipe. The material is first cut into sections of appropriate length. Then, each section of stem/stud is necked at both ends to form a ring bead in the middle. A third procedure is to stamp a J-shaped canal in the upper periphery of the stem/stud. The J-shaped canal mates with a corresponding round protrusion on the inner side of a lamp pipe to slide in and to be fixed to the stem/stud. A fourth pressing step is to make a number of slits (say, four slits) in the lower portion of the stem/stud tube, to form tabs between each two neighboring slits. The stem/stud tube is now ready for painting or plating. After painting or plating, the stem/stud tube can be inserted through the holes in the base cover (2), the weighting block (33), the base bottom (44), and the washer (5) for assembly. A folding and pressing procedure will then fold the tabs outwardly to realize a tight fit. If the base bottom (44) is made of sheet steel, the washer (5) can be dispensed with.

Figure 2:
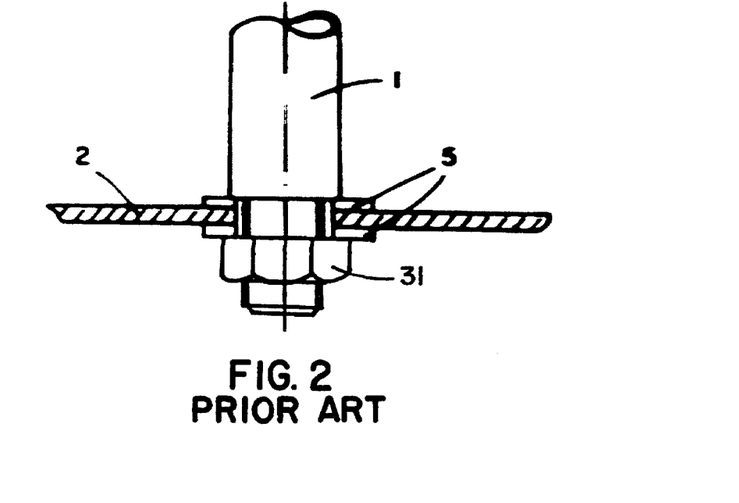
FIG. 2 shows a prior art connecting structure comprising a necked stem/stud, washers and a nut, which stem/stud is hollow and may contain wires therein.

A third embodiment according to the present invention is shown in FIGS. 6(a), 6(b), 6(c), and 6(d). A corresponding prior art typical structure is shown in FIG. 2, comprising a stem/stud tube (1), a base (2), washers (5), and a nut (31). The lower end portion of the stem/stud tube (1) is machined to form a shoulder and a threaded portion. Fitting is performed by threading a nut onto the threaded portion of the stem/stud, still the usual method. In FIGS. 6(a), 6(b), 6(c), and 6(d) a new structure is seen to comprise a stem/stud (1), a base cover (2), two tabs (7) and (8) and two recesses (9), which are formed by punching off part of the tube end. When the tabs (7) and (8) are folded outwardly, as indicated by (7a) and (8a), they clamp the stem/stud tightly to the base cover.

As compared with the prior art structure in FIG. 2, the new structure in FIGS. 6(a), 6(b), 6(c), and 6(d) is simple and easy to assemble, unlike the stem/stud (1) in FIG. 2 which must be cut from a thick-walled pipe and then necked through a pressing procedure and further shouldered and threaded on a lathe. Since the inside dimension of the pipe is reduced in diameter, sometimes even a common 18 AWG (American Wire Gage) power cord can not pass through, so that a 20 AWG nickel-core high temperature cord has to be used instead, which in turn increases the cost.

Figure 6A:
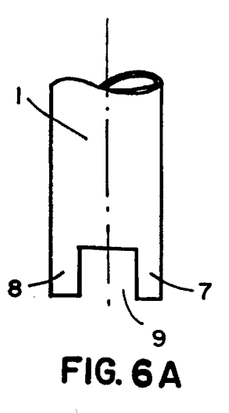
FIGS. 6(a), 6(b), 6(c), and 6(d) show a third embodiment of the present invention.
Figure 6B:
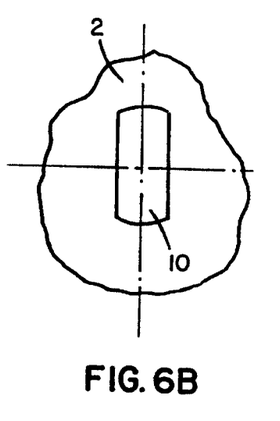
Figure 6C:
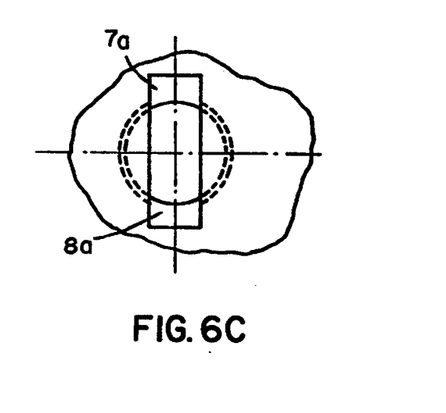
Figure 6D:
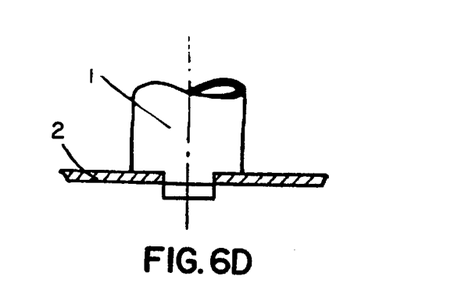

Now in FIGS. 6(a), 6(b), 6(c), and 6(d), the stem/stud (1) can simply be cut from a thin-walled seamed pipe. Moreover, there is no strict requirement for the welding seam since recesses (9) can be arranged where the seam runs and the seam part is actually punched off. After punching to form tabs, the stem/stud (1) can then be painted or plated. During painting or plating, the stem/stud (1) can be thoroughly coated without any protection means to cover a threaded portion, as is the case in the prior art structure shown in FIG. 2. FIG. 6(b) shows a "double-D" hole (10) in the base cover (2) of the new structure. Of course, in the case of a pipe with a large diameter, three or more tabs can be formed for a proper tight clamp in which case the hole (10) will also be correspondingly changed in shape. FIGS. 6(c) and 6(d) shows that the stem/stud (1) has been inserted into the hole (10) in the base cover (2), and that the two shoulder-like top edges of the recesses (9) are just resting upon the top surface of the base cover (2), while the tabs have been folded as shown by (7a) and (8a) through a folding procedure as described in the second embodiment of the present invention. As compared with the prior art structure in FIG. 2, the pipe in the third embodiment requires only one pressing and folding procedure, and thin-walled seamed pipe can be used instead. There is no need to use any nuts, washers, etc. to complete the assembly. A simple folding and pressing procedure will get the base cover (2) tightly clamped between the top edges of said recesses (9) and the folded tabs (7a) and (8a).

Figure 7:
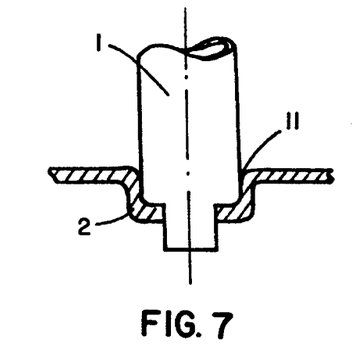
FIG. 7 is a sectional view of a fourth embodiment of the present invention.

FIG. 7 is an illustration of a fourth embodiment of the present invention, where another new structure is given, comprising a stem/stud (1), same as in FIGS. 6(a) and a base cover (2) having a countersink (11), or recessed tubular portion, for reinforcement to prevent the stem/stud (1) from tilting or making any sideway motion. This embodiment is particularly suitable for a standard lamp having a long lamp pipe and a base cover made of thin sheet metal or plastic. For this embodiment, if the base cover is made of plastic or other soft metals such as aluminum, etc., it is recommended to use one or two washers of suitable size, so as to dissipate the local stress to a larger area.

Figure 8:
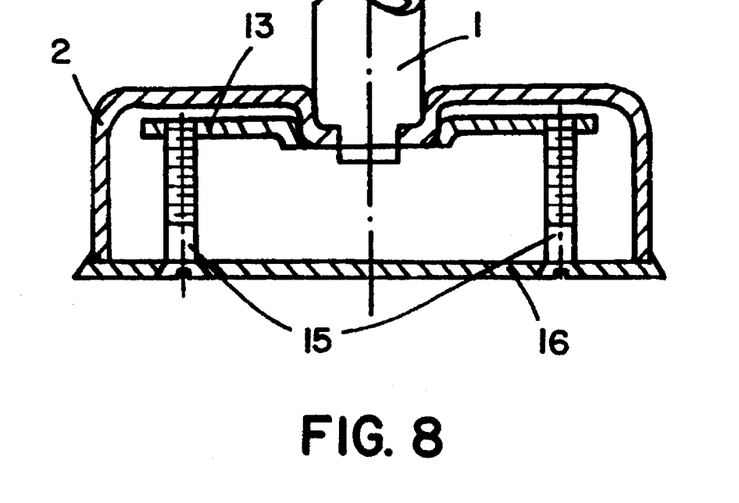
FIG. 8 shows a fifth embodiment.
Figure 9:
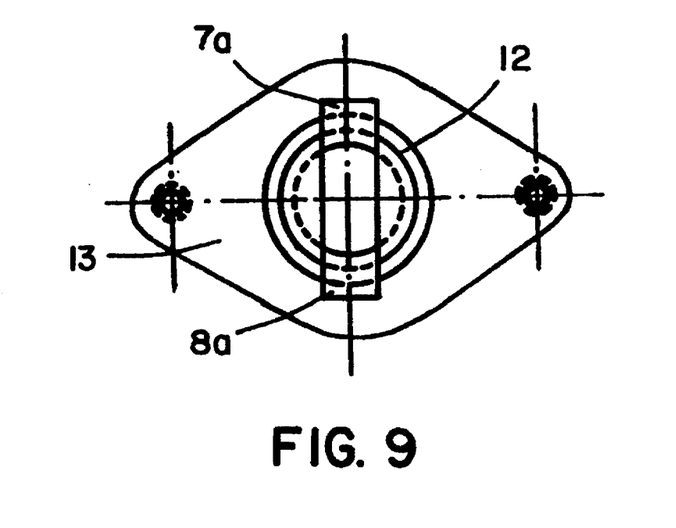
FIG. 9 is the bottom view of the embodiment in FIG. 8.

The fifth embodiment according to the present invention is shown in FIGS. 8 and 9, where a new structure is seen to comprise, besides a stem/stud (1) and a base cover (2), a supporting plate (13), having a formed mating surface dimension and a hole (12) to match the outer surface of extrusion made by a countersink in the base cover (2). The supporting plate (13) also has two tapped holes for two screws (15) to screw into and to pull a bottom cover (16) hard against the lower edges of the base cover (2) after the tabs (7*a*) and (8*a*) are folded and pressed hard upon the lower side of the supporting plate (13). In this manner, the plate (13) is tightly clamped between the base cover (2) and the tabs (7*a*) and (8*a*), and stress is dissipated to a very large area.

A similar prior art structure comprises a plate welded to the bottom of a base cover, and the plate has two tapped holes for screws to screw into. Welding is indispensable because the base is usually a sheet metal workpiece made by a drawing process, so it is impossible to tap screw holes therein. In the above-mentioned fifth embodiment structure, the countersink in the base cover (2), the hole (12) in the supporting plate (13) and the plate (13) itself all help toward dissipation of stress. Moreover, the plate (13) is intended to pull the stem/stud (1) hard against the base cover (2) to prevent any part(s) from getting loose as is the case in the prior art structures.

Figure 10:
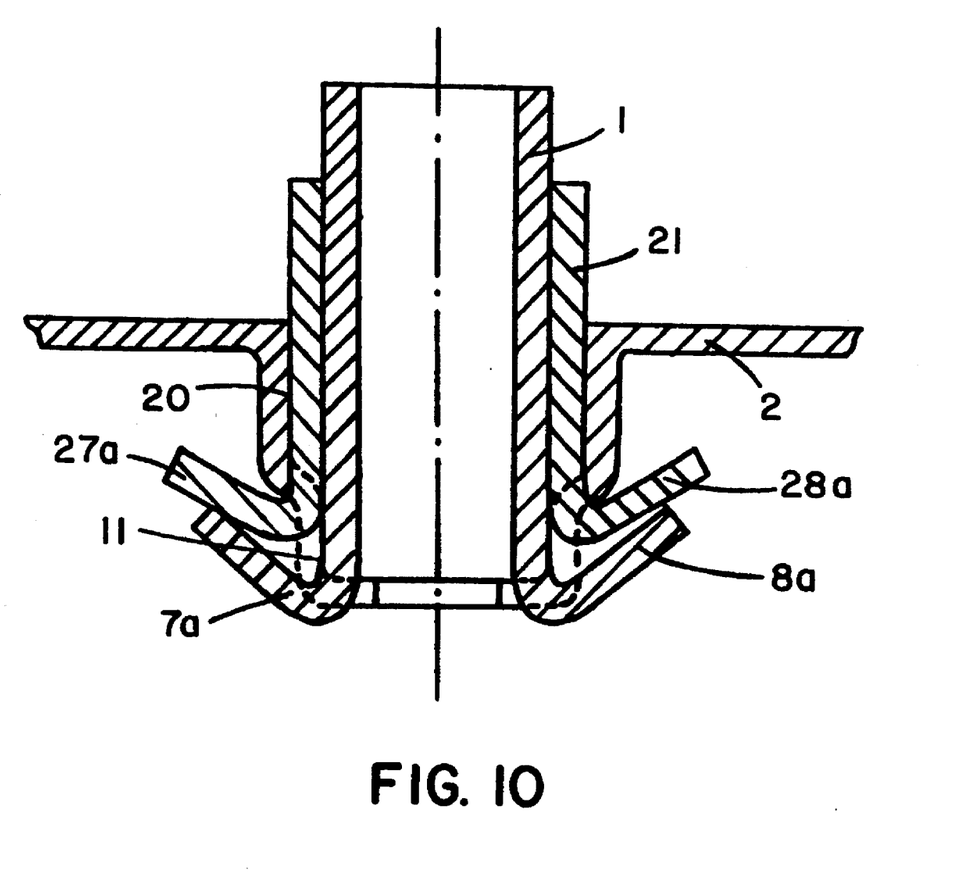
FIG. 10 is a sectional view of a sixth embodiment of the present invention.

FIG. 10 illustrates the sixth embodiment of the present invention, where the base comprises two concentric countersinks (11) and (20), or recessed tubular portions, respectively. Through a common "double D" hole, tabs (27*a*), (28*a*) of a sheath (21) and tabs (7*a*) and (8*a*) of a stem/stud (1) are folded to complete assembly. In this case, the stem/stud (1) is further reinforced as compared with the fourth embodiment. If, for instance, outer countersink (20) has a diameter of 12.7 mm, and the inner countersink (11) has a diameter of 12 mm, then the base cover (2) can be used for mating either an inch system pipe or a metric system pipe. Even if a batch of inch system pipes is mixed with metric system pipes, the mixed batch can still be supplied to the assembly line without any malfunction. After assembly, anyone can distinguish at a glance if the pipe used is of the inch system or of the metric system because when a pipe of metric system is used, there is a 0.35 mm gap between the countersink (20) and the stem (1). And in a subsequent painting process, the gap can be covered by paint and will be no longer visible. In the prior art, however, the stem, the nut, the washer and the hole in the base cover must be either of the metric system or of the inch system, and can never be mixed. If a pipe of a wrong system is supplied, the whole assembly line will have to be stopped at once.

The present invention has the following advantages. First, the manufacturing processes is greatly simplified; no lathe working and threading process are required. Instead, only press work procedures are needed. Therefore, materials of low grade can be used, and a broader manufacturing tolerance can be allowed. Next, the number of parts involved is reduced to a minimum. Further, pipes of inch system and metric system can be mixed in use. Finally, the product of the present invention is more reliable and rigid, costs less to manufacture, and is produced more quickly than existing stem/stud assemblies.

What is claimed is:

1. A connecting assembly for fixing a stem/stud of a portable lamp to a base of the same, comprising:
    a tubular stem/stud having two or more tabs extending from and equally spaced about a lower portion of said stem/stud, said tabs defining recesses therebetween;
    a base having a recessed tubular portion formed therein, said tubular portion having an inner diameter corresponding to the outer diameter of the stem/stud such that said stem/stud is receivable in said tubular portion; said recessed tubular portion having a hole formed at its end concentric with said tubular portion, said hole having a major diameter equal to the diameter of said stem/stud and shoulders corresponding to said recesses of said stem/stud;
    a supporting plate with a formed mating surface comprising a second recessed tubular portion and a hole concentric with said second tubular portion, said second tubular portion fitting the outer surface of said tubular portion in said base;
    said stem/stud fitted within said tubular portion, said tabs of said stem/stud extending through said hole of said tubular portion and through said hole of said supporting plate such that top edges of said recesses abut top surfaces of said shoulders, said tabs of said stem/stud being folded outwardly to clamp said stem/stud and said supporting plate to said base;
    a bottom cover; and
    fastening means for fastening said bottom cover to said supporting plate.

2. A connecting assembly for fixing a stem/stud of a portable lamp to a base of the same, comprising:
    a tubular stem/stud having two or more tabs extending from and equally spaced about a lower portion of said stem/stud, said tabs defining recesses therebetween;
    a sheath having a plurality of tabs formed at one end thereof and defining recesses therebetween;
    a base having a first recessed tubular portion formed therein having an inner diameter corresponding to the outer diameter of said sheath, said first tubular portion having shoulders formed at its end corresponding to said recesses of said sheath; a second recessed tubular portion being concentrically formed at the end of said first tubular portion having an inner diameter corresponding to the outer diameter of said stem/stud, said second tubular portion having a hole formed at its end concentric with said first and second tubular portions, said hole having a major diameter equal to the diameter of said stem/stud and shoulders corresponding to said recesses of said stem/stud, recesses being formed in said second tubular portion corresponding to said tabs of said sheath;
    said sheath fitted within the first tubular portion, said tabs of said sheath extending through said first tubular portion such that top edges of said recesses abut top surfaces of said shoulders of said first tubular portion, said tabs of said sheath being folded outwardly through said recesses in said second tubular portion to clamp said sheath to said base; and
    said stem/stud fitted within said sheath and further fitted within the second tubular portion, said tabs of said stem/stud extending through said hole such that top edges of said recesses abut top surfaces of said shoulders in said hole, said tabs of said stem/stud being folded outwardly to clamp said stem/stud to said base and said sheath.

3. A connecting assembly for attaching a stem/stud of a portable lamp to a base of the same, comprising:

a tubular stem/stud having two or more tabs extending from and equally spaced about a lower portion of said stem/stud, said tabs defining recesses therebetween;

a base having a first recessed tubular portion formed therein having an inner diameter made in the inch system of measurement; a second recessed tubular portion being concentrically formed at the end of said first tubular portion having an inner diameter made in the metric system of measurement; said first and second tubular portions receiving either an inch system stem/stud or a metric system stem/stud; said second tubular portion having a hole formed at its end concentric with said first and second tubular portions, said hole having shoulders corresponding to said recesses of said stem/stud; and said tabs of said stem/stud extending through said hole in said base such that top edges of said recesses abut top surfaces of said shoulders, said tabs being folded outwardly to clamp said base between said top edges of said recesses and said folded tabs.

* * * * *